United States Patent Office

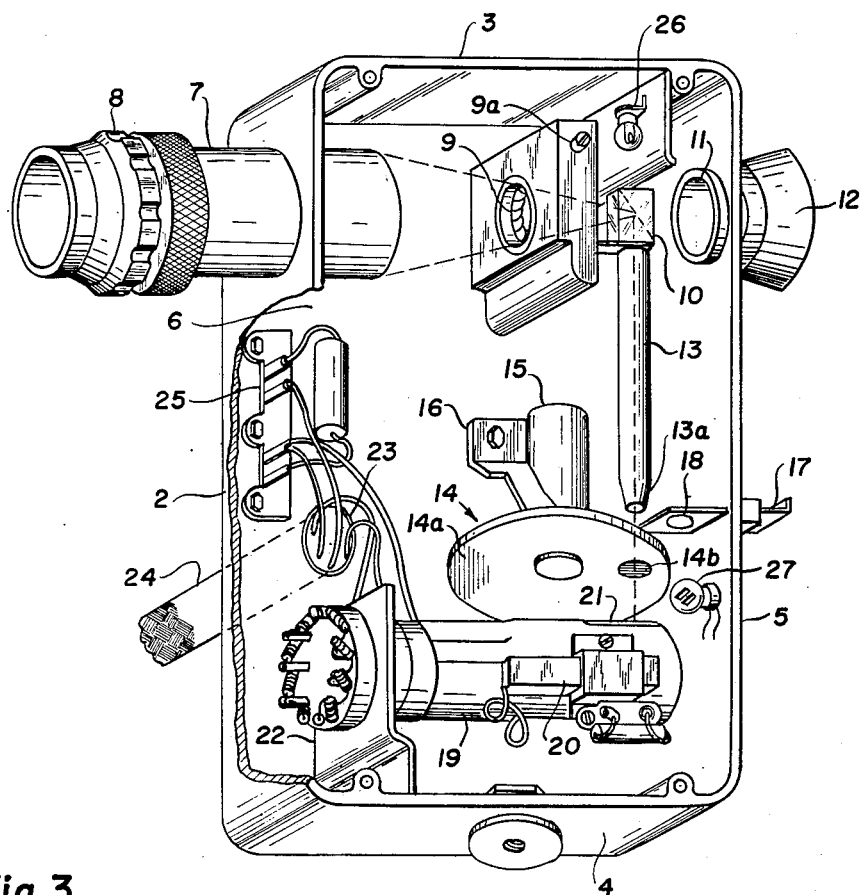
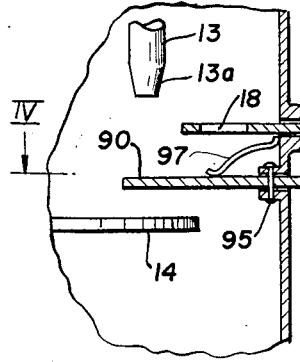
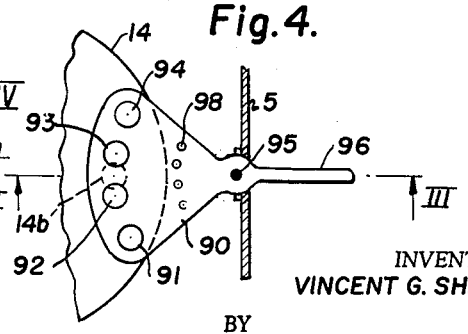

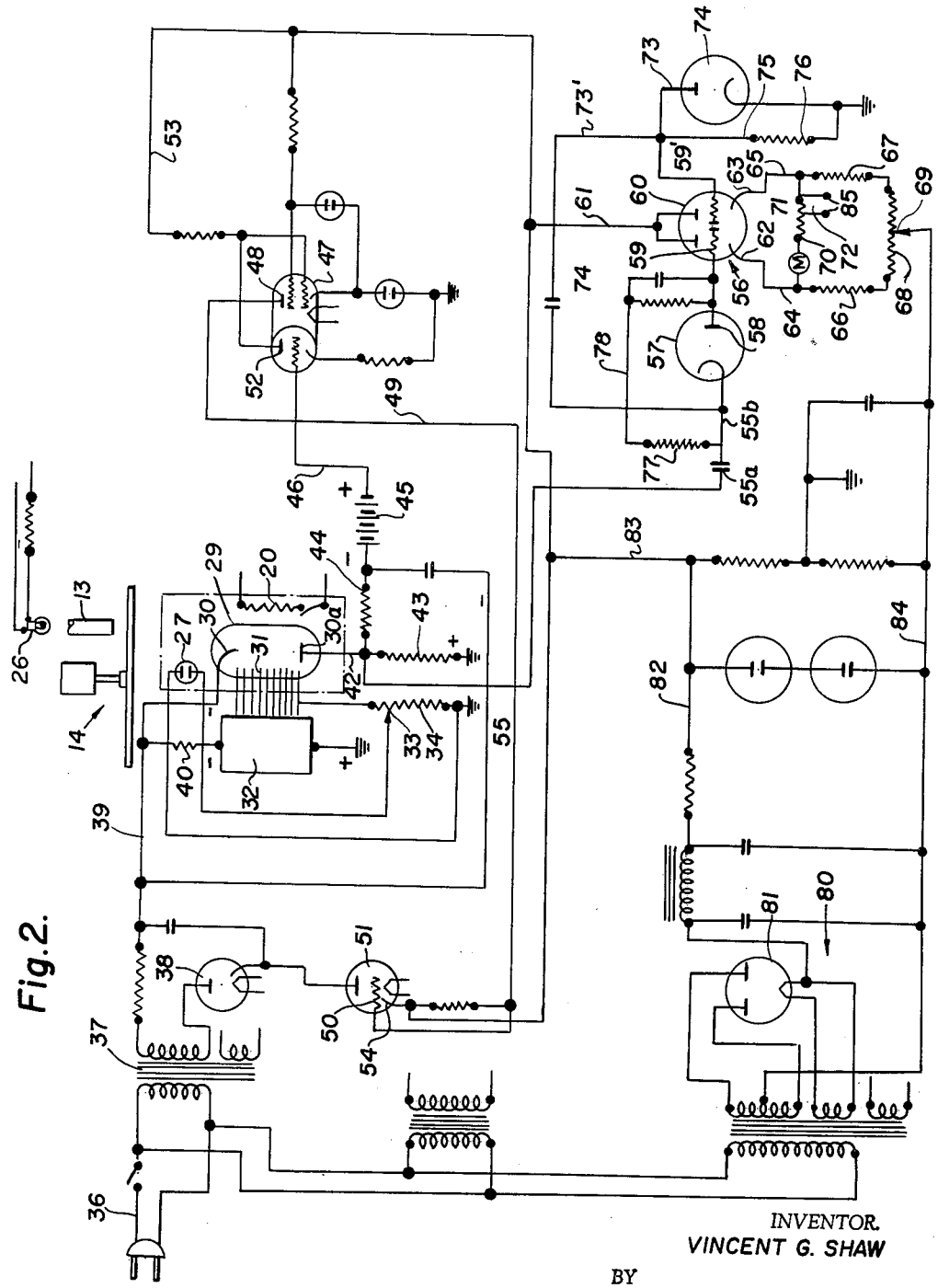

3,195,398
Patented July 20, 1965

3,195,398
TEMPERATURE SENSING HEAD HAVING
FATIGUE ELIMINATING MEANS
Vincent G. Shaw, Unity Township, Westmoreland County,
Pa., assignor to Latronics Corporation, a corporation of
Pennsylvania
Filed July 3, 1961, Ser. No. 121,677
2 Claims. (Cl. 88—22.5)

This is a continuation-in-part of application Serial No. 725,550, filed April 1, 1958, now Patent No. 3,006,242.

This invention relates to optical temperature measuring apparatus of the type in which temperature is measured by measuring the difference in energy in separate areas of the spectrum emitted from a hot body and interpolating the difference in terms of temperature. Such apparatus is also capable of use in matching or measuring color values from transmitted or reflected light. More particularly, this invention is for a sensing head for apparatus of this kind.

A preferred embodiment of my inevention as disclosed in the aforementioned application embodies a photo-multiplier tube housed within a portable box or camera-like device, termed a "sensing head." In addition to the photo-multiplier tube, which is housed in an enclosure capable of maintaining a constant temperature about the tube, this head has a lens for receiving light from an external source and transmitting it to the photo-multiplier tube. There is a rotating disk in the sensing head between the lens and the photo-multiplier tube having at least two color areas or filters that are alternately brought by rotation of the disk between the lens and the photo-multiplier tube. There is connected into the anode of the photo-multiplier tube a circuit for reducing the voltage across the anode and cathode as the overall light intensity increases, and increasing it as the intensity decreases with a cut-off when the light energy falls below a predetermined level. The purpose of so regulating the photo-multiplier tube voltage is to make the instrument insensitive to vibrations in overall light intensity, as when the instrument approaches or recedes from the light source. This regulatory circuiting, however, is too slow in its response to eliminate the pulsations or rise and fall of the voltage as one color filter and then the other passes in rapid succession across the light path to the photo tube, and these pulsations are amplified and registered on a peak reading voltmeter, which is calibrated in terms of temperature.

In the said apparatus, the enclosure for the photo-multipiler tube, the two color filters and the driving motor resembling generally a camera, is connected through a flexible cable to an instrument casing which houses the power pack for the apparatus, the control circuits and amplifying and voltmeter circuit, so that this enclosure or sensing head may be moved about or set on a tripod while the heavy instrument case may remain relatively fixed.

It is to the sensing head that the present invention is particularly directed.

Photo-multiplier tubes are affected by ambient temperatures, so that, as disclosed in my aforesaid application, I enclose the tube in a compartment in which a constant temperature within practical limits may be maintained. More serious is a phenomenon sometimes referred to as "fatigue"" where a tube that is in the dark for a period of time will not instantly and accurately respond when it is first exposed to light. However, after a short exposure, the tube manifests the desired light response characteristic for an instrument of this kind. This quality varies in different tubes which exhibit individuality to a surprising extent. Often temperature measurements must be made on very short exposure, and this delay of the tube in reaching a proper condition of response is much too long. Some tubes may manifest this fatigue after only a few minutes in total darkness; others may not acquire it for much longer periods.

A primary object of the present invention is to eliminate this fatigue.

To assure accurate results, one should be able to aim the lens of the sensing head, and another object of the present invention is to provide a sensing head with a straight-through line of sight, utilizing a beam splitter for deflecting some of the light to the photo-multiplier tube.

Still another object of this invention is to better regulate the total light to the photo-multiplier tube and project a beam of constant area through the color filter to the sensitive area or cathode of the tube, and to impinge the light always onto the same area of the cathode. To this end light from the beam splitter is carried through a "light pipe" in the sensing head, while an adjusting iris may be provided between the beam splitter and the lens for varying the total area of light falling on the beam splitter. Thus there is a constant beam area for the photo-multiplier tube to "see" and the field may be varied by opening or closing the iris while the area of the cathode exposed to light is not varied.

Sometimes it is desirable to make a quick check of the instrument to make sure that it is functioning properly. To this end a further object of the present invention is to provide a known source of radiation which can be turned on and which will be effective upon the sensing mechanism so that the reading on the temperature indicating instrument can be instantly checked against the known temperature of the hot filament of this source of radiant heat.

A further object of the present invention is to provide in the sensing head means for modifying the light characteristics transmitted to the filters so that if the instrument is exposed to temperatures beyond the normal range of response, this film or screen may be projected into the light path in advance of the filter and reduce or modify the intensity of the energy to a pre-determined value. The reading on the temperature scale is then interpolated by known factors into terms of the higher temperature range.

These and other objects and advantages are secured by this invention. According to the invention there is associated with the photo-multiplier tube a small neon lamp connected to the so-called last dynode of the photo-multiplier tube. When the tube is shut off from external light the maximum voltage is applied to the tube, causing the neon light to glow with sufficient intensity to keep the tube photo-responsive so that fatigue from darkness does not occure as long as the instrument is plugged into a source of current, but when sufficient external light falls on the photo-multiplier tube to produce a temperature reading the voltage on the last dynode will decrease to a level where the neon tube goes out. Thus the admission of outside light or the cutting off of the outside light "turns" the neon tube off or on and the tube is never in total darkness while it is connected to a power source. When temperature readings are being made, there is no light from the glow lamp or neon tube to distort the response of the photo-multiplier tube.

The sensing head is a generally rectangular box, resembling generally an amateur movie camera, with a lens tube projecting from a narrow side of the box near its top. There is a sight opening opposite the lens tube and there is a beam splitter in the box or enclosure between the sight opening and the lens, so that one may look directly through the eye opening and the lens directly at the point to which the lens is aimed. An adjustable iris is located between the lens and the beam splitter. This beam splitter sends part of its light through a light pipe, such as a rod of clear plastic, the pipe being at right angles to the line of sight above described, and it extends downwardly toward the bottom of the box. The light pipe terminates in proximity to the sensitive area of a photo-multiplier tube, but there may be a slide accessible to the exterior of the box and operable to move a light intensity reducing screen into the light path to the tube. This screen is utilized when temperatures higher than the normal range of response of the instrument are encountered. Above the light splitter is a light bulb having a known filament temperature for projecting a test beam onto the photo-multiplier tube when a quick check of the instrument is to be made. For overcoming fatigue the neon lamp is mounted near the housing for the photo-multiplier tube where its light will impinge on the tube at not too great intensity.

The organization and construction of the device may be more fully understood by reference to the accompanying drawings in which:

FIG. 1 is a somewhat schematic view showing the sensing head in perspective with one of the sides thereof removed and part of it broken away to show more of the inside structure, and with much of the internal apparatus schematically shown;

FIG. 2 is a circuit diagram generally similar to that disclosed in my aforesaid application, but showing the neon tube in relation to other parts of the circuit;

FIG. 3 is a fragmentary vertical section in the approximate plane of line III—III of FIG. 4 showing a still further modification of the instrument; and FIG. 4 is a fragmentary horizontal section in the plane of line IV—IV of FIG. 3.

Referring to the drawings, and first to FIG. 1, the sensing head comprises a camera-like box of generally rectangular shape, the width of which is narrow compared to its height and length. It has a front wall 2, a top 3, a bottom 4, a rear wall 5, a fixed side 6, and the other side is removable for access to the interior. In the drawings, the box is shown without the removable side panel.

Mounted on the front wall 2 near the top of the box is a lens tube 7 with a lens mount 8 thereon, the lens in the mount not being shown. This lens directs outside light from a source toward which the device is pointed through an iris 9 of the type commonly used in cameras, and which may have an adjusting handle 9a accessible from the outside of the head, as will be readily understood by those skilled in the art, or which may be adjusted by removing the side panel of the mrchine. The light which passes through the iris passes into a beam splitter 10, which is also well known in optical fields, and which includes prisms so arranged that part of the entering light passes straight through the beam splitter to a viewing opening 11 in the rear wall 5. There is an eye-piece 12 projecting from the rear of this opening, and there may be a correcting lens in the eye-piece, as is also well understood in the optical arts, to restore any image to its correct attitude after inversion in the preceding optical system. This opening 11 and eye-piece 12 are in axial alignment so that one may aim the instrument directly toward an object to be examined by looking through the eye-piece.

The other part of the split light beam falls on the top end of a vertical light pipe 13, which may be a round rod of clear plastic. The lower end 13a of the light pipe is preferably an inverted truncated cone, that is, it tapers downwardly to a smaller diameter. The lower end of the light pipe terminates above a rotating filter disk 14. This disk is driven at high speed by a motor 15. A bracket 16 supports the motor and disk assembly on the closed side panel 6 of the casing. As explained in the copending application, the disk has two contrasting light-transmitting or filter areas, one of which is preferably smaller than the other. The larger area, which for example may be red, is designated 14a, and the the smaller filter which, again for example may be blue, is 14b. The smaller one preferably has an area at least as great as the end of the light pipe and is so positioned that as the disk rotates it will pass under the light pipe and all of the light will, for a short instant of time, pass through it, but most of the time it will pass only through the larger area, 14a.

Mounted on the rear wall of the casing is a movable plate, as for example a slide plate 17, having a filter area or darkened area 18 that is normally out of the path of light from the light pipe to the rotating filter disk, but which, by moving the slide, may be projected into the light path, and when so interposed in the light path, it will reduce the light energy to the filter and photo-multiplier tube for the purpose hereinafter explained.

Below the rotating filter disk 14 there is mounted in the box-like enclosure a housing 19 within which is a photo-multiplier tube. This housing is provided with a small electric resistance heater and thermostatic switch, as explained in said earlier application, and the heater and switch assembly at the side of the enclosure is within the structure 20 on the side of the enclosure 19. The photo-multiplier tube is not shown in FIG. 1, but it has a sensitive area or photo cell cathode at 21 in line with the end of the light pipe 13 so that a light beam is projected from the end of the light pipe through the rotating filter, and if it is in place, also through screen 18 to the sensitive area of the tube.

The base in which the photo-multiplier is mounted is designated 22 and carries the connectors for connecting all of the elements of the photo-multiplier tube, and these connectors, without the attendant wiring, are schematically shown. Inside the box is a terminal element 23 forming the connector for a multi-conductor flexible cable 24 through which the sensing head is flexibly connected into a relatively heavier casing (not here shown but explained in the said copending application), containing the heavier components of the electrical system and components that need not be mounted in the head so that the head itself may be readily moved about and held in one's hands and aimed without the operator being burdened by the weight of such parts.

There is a connector panel 25 inside the box to which wires may connect for various electrical elements within the housing, the details of which are here unimportant. The electric motor for rotating the filter disk is one of such devices. The heater for the photo tube enclosure is another. Another such device is an incandescent lamp 26 above the beam splitter 10, the filament of which is operated at a predetermined known temperature. It may be controlled by a convenient switch such as a push button switch, not shown. Its purpose, as will hereafter more fully appear, is to project a beam of light from a known temperature source through the light pipe for a convenient quick test of the instrument.

An important feature of the present invention is the provision of a neon lamp 27 at some location inside the box where light therefrom will fall upon the cathode of the photo-multiplier tube, preferably not too directly or intensely. Its purpose is to keep the photo-multiplier tube continuously alert or responsive, so long as the apparatus is connected to a current source and when no light of sufficient intensity is entering from an external source. As above explained, photo-multiplier tubes vary in their individual characteristics, but they develop a sluggishness to response to light after they have been in the dark for some time, a phenomenon called "fatigue." The purpose of the neon lamp is to bring the photo-multiplier tube out of this condition before the instrument is used, or prevent it from going into this condition, since in some cases temperature measurements must be made in a very short period of time sufficient to bring the tube out of its lethargy.

While the neon lamp could be switched on and off manually, I prefer that its operation be controlled automatically. A simple way of accomplishing this is shown in FIG. 2 where 29 designates the photo-multiplier tube with its cathode 30, anode 30a, and a series of dynodes 31. As is well understood in the art, these dynodes are connected into a resistor at spaced positions along its length, the resistor being connected across a source of current. In FIG. 2 this resistor and dynode connection is indicated by a block diagram 32. The upper dynode in the diagram is nearest the negative pole of the current supply source, to be hereinafter described, and the lowermost dynode is nearest the positive pole. According to this invention, the neon lamp 27 is connected to the positive side of the current source and to the adjustable contact 33 of a resistor 34 connected between the positive side (ground) of the current supply source and the last dynode of the series 31. By "last" dynode I mean the one nearest the positive side of the resistor 34 and most remote from the cathode.

Connected in this way, there is a maximum voltage from ground to said last dynode when the photo-multiplier tube is dark or in subdued light, and the neon tube will glow sufficiently to prevent darkness fatigue of the photo-multiplier tube. As soon as the photo-multiplier tube is exposed to light energy sufficient to operate the instrument, there will be a drop in potential between the last dynode and ground, and the neon tube will be starved and cease to function. As soon as external light is cut off the neon tube will again be energized to create a glow. The neon lamp is preferably removed from a position directly in line with the cathode of the photo-multiplier tube so that the light energy from the neon lamp is never sufficient to extinguish itself.

The remainder of the circuit is the same as disclosed in my prior application above referred to, and is shown in FIG. 2 of the present drawings. In this figure, 36 indicates a connection to a commercial lighting circuit. Power from this source passes through transformer 37 which is a voltage step-up transformer, and the high voltage from the secondary of this transformer is passed through a half-wave rectifier circuit, including a diode 38 with a filtering resistance and condenser. The negative output of the rectifier is connected through wire 39 to the cathode of the photo-multiplier tube. It is also connected in the usual way through a resistor 40 to the dynode of the photo-multiplier tube. The direct current voltage is of the order of 1500 volts.

The anode 30a of the photo-multiplier tube is connected through wire 42 and resistor 43 to the positive (ground). I term the resistor 43 a "load resistor." The anode is also connected through wire 44 to a wire 42 between the anode and the load resistor. This wire is connected to a negative pole of a D.C. biasing voltage, more correctly called a "reference voltage source," indicated in the drawings as a standard 22½ volt battery 45, but it may be derived from the power source that operates the instrument. The positive side of the battery or D.C. source 45 is connected by wire 46 to the input grid of an amplifier circuit to the signal input of an amplifier circuit, which may be of any suitable kind, but is here shown, for purpose of illustration, only as including a multiple electrode vacuum tube 47 used for amplifying circuits, such as a type 6AN8 tube. Wire 46 leads to the input grid of this tube. One anode 48 of tube 47 is connected through wire 49 to the grid 50 of a triode 51 which acts as a voltage regulator for the recitifier 38. The other anode 52 of the amplifier is connected through wire 53 with the cathode 54 of the tube 51.

The operation of this portion of the circuit as so far described is as follows: As light falls on the photo-sensitive tube, the positive current flow from ground to the anode is through by the resistor 43 and its flow to the amplifier circuit is broken by the negative polarity of the battery 45 until such time as the light is strong enough to generate a voltage greater than the 22½ volts of the battery, plus enough to overcome certain inertia in the amplifier, say about 24 volts in all.

The light intensity must reach a point where the current passed by the photo-multiplier tube will overcome this reference voltage here assumed to be 24 volts, before there is an effective current flow to the grid of the amplifier tube 47. This establishes the minimum level of light intensity to which the instrument will respond. When the overall light intensity on the photo-multiplier tube increases appreciably above the reference voltage, the potential drop across the anode load resistor 43 of the photo-multiplier tube will be fed to the amplifier circuit and a current will be fed back to the control tube 51 to cause the rectifier to pass less current and bring the wire 39 and the cathode of the photo-multiplier tube to a lower voltage and re-establish a constant potential across the anode load resistor. It will then be as though the photo-multiplier tube "sees" no increase in the light intensity. In other words, the amplifier circuit reduces the voltage on the cathode of the photo-multiplier tube as the light intensity to which that tube responds increases, with the result that changes in the overall intensity of the light falling onto the photo-multiplier tube above the minimum or reference voltage above referred to causes no increase in the output of the tube and its output remains at a substantially constant value. The photo-multiplier tube "sees" no increase at all in the light intensity above the minimum level. There is, however, a very short time lag or inertia in the control circuit provided by the amplifier tube 47 and its circuit which is greater than the time required for the smaller or blue segment of the rotating disk to pass under the light pipe in the sensing head. Preferably the time lag of this control circuit, however, does not exceed the time for the filter disk to rotate through one complete cycle of red and blue.

The effect of this is that after a minimum light intensity is reached, any intensity in the light energy above the minimum does not pass through the output circuit of the photo-multiplier tube, except that which may pass during the desirable time lag that takes place when the circuit is correcting itself to an overall change of light intensity.

Most of the time the photo-multiplier tube is exposed to the light energy radiated through the larger or red area of the rotating filter. When the smaller or blue area moves across the tube "line of vision," there is a change of intensity in the energy, but it occurs so quickly that the control circuit, including the amplifier tube 47 and the voltage regulating tube 51, has no chance to respond because of the short time lag in its functioning as above explained. Consequently this short change of intensity in the light energy is not cancelled out by the correcting effect of the control or regulating circuit, and may be detected in the output of the photo-multiplier tube as a succession of extremely short impulses or pips. The output of the photo-multiplier tube is carried by a wire 55 to a peak reading voltmeter circuit designated generally by the reference numeral 56, in which these impulses can be measured and interpolated in terms of temperature.

As explained in the application above referred to, the difference in size of the two areas of the rotating filter disk is desirable in order to produce a sharply defined or "square" form in the output of the photo-multiplier tube because of the energy difference in the two bands of the spectrum passed by the two filters. This sharply defined or square wave form can be more easily detected and measured than would be a wave form created by equal color filter areas. As a result of this arrangement the photo-multiplier tube may discriminate between short impulses represented by the difference in energy between the red and blue bands of the filter, and the overall change of intensity due, for example, to the instrument approaching or receding from the light source to which it is responding.

To better understand this, it may be pointed out that in one second, for example, the scanning apparatus may be moved from a twelve-foot distance from the radiating body to six feet. This is an adequate time, or in fact more than an adequate time, for the circuit to adjust itself to the increased light energy due to the closer approach to the radiating body. If the filter disk is rotating at 60 revolutions a second, or 3600 r.p.m. and the blue or smaller filter has an area equal to 10% of the disk, the blue impulse will be generated for 1/10 of 1/60 of a second, or for 1/600 of a second. Thus the overall change in intensity of the light is relatively gradual as compared to the duration of the single impulse generated by the passage of the smaller filter area between the light source and the photo-multiplier tube. The intensity of the light impulse or pip above or below a reference level established by the larger area of the rotating filter will be directly in proportion to the difference in energy in the spectrum of the radiating body in the red and blue ranges, or in any other different selected color bands. It is well known that as the temperature of a radiating body increases, the energy in the blue end of the spectrum increases, or the difference in energy between the red and blue ends of the spectrum increases. This difference in energy is reflected in the pips or output impulses of the photo-multiplier tube.

Wire 55 is connected through a block condenser 55a and wire 55b to the cathode of a half-wave rectifier 57 in the peak reading voltmeter circuit. The plate or anode 58 of this rectifier is connected to one grid 59 of a double triode 60 which may comprise, for example, a standard 6SL7 tube. The two plates of this tube are connected through wire 61 to a source of plate voltage to be hereinafter described. The two cathodes 62 and 63 of the double triode are connected through wires 64 and 65, and resistors 66 and 67 respectively to opposite ends of a resistance or potentiometer 68, the mid point of which is indicated at 69. There is a bridge circuit 70 across the wires 64 and 65 that includes a sensitive voltmeter 71 which, for temperature measuring, is calibrated in degrees of temperature. This bridge includes also a variable resistor 72. The other grid 59' of the double triode is also connected through wire 73' and blocking condenser 74 with wire 55b leading to the cathode of the diode 57. The grid 59' is also connected through wire 75 and resistor 76 to the cathode of the diode 74. There is a circuit in parallel with the diode 57 comprising a resistance 77, wire 78, and condenser 79 to the first grid 59 of the double triode 60.

All of this portion of the circuit designated generally as 56 into which the impulses from the photo-multiplier tube are fed, is essentially a peak reading voltmeter circuit. When all conditions are in balance, no current flows through the bridge circuit including the meter 71. The impulses generated by the smaller or blue filter disturbs this balance, tending to build up a charge on the condenser 79, thereby tending to keep a positive charge on the grid 59 of the double triode. This deflects the indicator of the meter 71, the extent of deflection depending on the amplitude of the impulses. It is therefore necessary that the color filter rotate at a high speed in order that the pulsations or pips are in close succession. The diode 57 impresses a constant voltage equal to the reference voltage above referred to as the reference voltage on the grid 59'. The provision of the wire 73' and the condenser 74 slightly reduces the sensitivity of the response of the voltmeter 71, but aids in balancing out tube or background disturbances or "noise," but since the condenser 74 is of much smaller value than condenser 79, the former being approximately .001 mfd. and the latter being, for example, .01 mfd., and there being no resistance corresponding to resistor 77, the desired signal is not balanced out by reason of the presence of the wire 73' and condenser 74, but only slightly reduced.

The remainder of the circuit designated generally as 80 is essentially a conventional power pack for supplying D.C. current to the double triode, and it includes a full-wave rectifier 81 and the conventional circuit therefor, including stabilizers and filters, a positive output voltage being impressed on wire 82, which is connected through wire 83 and wire 53 to the two anodes of the tube 47. The negative side of the rectifier represented by the wire 84 connects to approximately the mid point of resistor 68 through contactor 69 which is adjusted as conditions may require. If a recording voltmeter is to be used in addition to a direct-reading voltmeter, it may be connected across the two wires designated 85 in the bridge circuit 70.

In the instrument as constructed, the sensing head carries the photo-multiplier tube, the rotating filter, the thermostatically-controlled heater for the photo-multiplier tube, the neon tube, and the direct-current light source as above described, while the control circuit comprising the tube 47, the peak reading voltmeter circuit, the power pack, and the high voltage current source for the photo-multiplier tube are all contained within a separate receptacle through which the sensing head is connected by a flexible cable as above described.

The functioning of the instrument will be readily understood from the above description when the sensing head with the lens exposed is aimed toward an object to be examined, as for example a heat-radiating object. If the energy is above a predetermined minimum the photo-multiplier tube will be activated and impulses will be generated by the alternate passage of the two filter areas between the light source and the photo-multiplier tube. These impulses will be detected by the peak reading voltmeter, and interpolated in terms of temperature, or in terms of color value, as the case may be, if the instrument be used for comparing colors instead of measuring temperature. Since the activation of the photo-multiplier tube will cause a decrease in potential between the last diode of the photo-multiplier tube and the positive side of the high current voltage source, the neon tube will be exciting it automatically, and when the light intensity to which the photo-multiplier tube is exposed decreases below a predetermined level, the potential difference between ground and the last diode will increase, causing the neon tube to glow and keep the photo-multiplier tube activated, and thereby protect the photo-multiplier tube from the phenomenon of darkness fatigue.

The instrument functions effectively in a limited temperature range. For example, in a given high temperature range it may respond to temperatures several hundred degrees below or above a fixed point as determined by the components of the circuit and the reference voltage. There are occasions, however, where it may be desirable to use the instrument for the measurement of temperatures in a range above the range for which the instrument is designed to function. On such occasions the slide plate 17 can be moved to project the filter or screen 18 into the light path between the light pipe and the photo-multiplier tube. The filter 18 absorbs some of the heat energy from the light source, reducing the energy to a level at which the instrument will respond. There is then added to the temperature indicated by the peak reading voltmeter a predetermined figure which is a corrective factor for the energy thus absorbed to give the true temperature of the object being observed. If the screen or filter 18 is a neutral color such as a piece of smoked glass or gray glass, or is simply a piece of wire mesh screening, the energy absorbed in both bands of the spectrum passed by the two filters will be equal.

While it would be possible to operate the instrument by projecting a beam of light from the beam splitter 10 through the revolving color filter to the photo-multiplier tube, it is desirable to use the light pipe 13 because it will project a spot of illumination of always the same area to the photo-multiplier tube, and the area of the cathode which is illumminated will be always the same and of the same size. Consequently any normal change in the opening through the iris 9 will not diminish or increase the extent of illumination on the photo-multiplier tube, but will enable the field to which the instrument responds to be expanded or reduced as may be required.

In addition to the screen 18 that may be moved into and out of the light path between the light pipe and the rotating filter, there may be a selectively operable internal color changing screen or shutter. This is shown in FIGS. 3 and 4 where similar reference numerals have been used to designate corresponding parts. As here shown there is a shutter member 90 having a series of light passages numbered 91 to 94 therein. This shutter is in the form of a segment of a circle pivotally supported at 95 on the rear wall of the box, and it has an operating extension 96 at its outer end. This shutter is always in the light path between the photo-multiplier tube, it being here shown at a level below the screen 18 and above the rotating disk 14. It is moved by operation of the handle 96 so that one of the light passages 91, 92, 93, or 94 is centered under the end of the light pipe. A spring detent 97 cooperating with the indentations 98 in the shutter holds the shutter in any position to which it may be moved, the detent mechanism here shown being merely an illustration of a holding means for preventing the shutter from free movement.

The light passage 91 may be entirely open, while the passages 92, 93 and 94 may contain different color screens, as for example different shades or intensities of yellow. If the areas 14a and 14b are red and blue respectively, and one of these yellow filters 92, 93 or 94 is projected into the light path, then the combined effect of the blue and yellow will be to pass light in the green area of the spectrum to the photo-multiplier tube, while the yellow and red will modify the red area of the spectrum to which the photo-multiplier tube is exposed. This may be useful in raising the temperature range to which the instrument will respond, or with other colors may decrease the temperature range to which the instrument will respond. Where the energy in the entering beam of light is quite intense, it may be desirable to use the screen or filter 18 merely to reduce the effect of the light upon the photo-multiplier tube, or the screen 18 may be used in conjunction with one of the secondary filters 92, 93, or 94. In other words, 92, 93 and 94 may be complementary to 18.

At times it may be desirable to make a quick check of the instrument. To do this a cap is put over the lens tube to exclude light and the incandescent lamp 26 is energized. The operating temperature of the filament of the lamp has been previously determined. The light from the lamp is transmitted through the light pipe and through the filter into the photo-multiplier tube. If the instrument is working properly, the indicator should indicate a temperature corresponding to the known temperature of the lamp filter. This is not an entirely foolproof test, but can be relied upon to show that the instrument is functioning in all respects.

While I have shown certain particular constructions for the sensing head, it will be understood that the parts may be otherwise constructed and arranged within the contemplation of my invention and under the scope of the following claims.

I claim:

1. In an instrument of the class described having a sensing head including a box within which is enclosed a photo-multiplier tube with means for admitting light from a selected source to the photo-multiplier tube and wherein there is a filter having contrasting filter areas in the box operable to alternately pass light from the external source through one and then the other of said filter areas to the photo-multiplier tube, the photo-multiplier tube having a series of dynodes of decreasing positive voltage from one end of the series toward the other, the photo-multiplier tube being in a circuit which comprises means for rendering it insensitive to light below a predetermined minimum intensity a source of direct current for the photo-multiplier tube, the invention which comprises providing within the box a neon lamp positioned to illuminate the sensitive area of the photo-multiplier tube and connected with the most positive dynode of said series and the positive pole of the direct-current source whereby current to the lamp is starved when sufficient light from the external source falls upon the photo-multiplier tube to activate it and said neon lamp glows to illuminate the tube when the light from the external source falls below a predetermined level.

2. A sensing head for an instrument of the class described comprising a box, a lens tube on the box opening into the box, an eye-piece on the box opening into the box opposite the lens tube, a beam splitter in the box interposed between the lens tube and the eye-piece through which part of the incident light is continuously transmitted to the eye-piece whereby the instrument may be aimed by looking through the eye-piece and lens tube directly toward the object to be observed during operation of the instrument, a fixed light pipe at right angles to the line of sight from the eye-piece through the lens tube, the beam splitter and light pipe being arranged to transmit part of the entering light from the lens tube directly into the light pipe, a photo-multiplier tube and enclosure therefor in the box, the light-sensitive area of said tube being spaced from the end of the light pipe in direct line therewith, a rotatable filter disc mounted for rotation about a vertical axis parallel with the light pipe with a portion of the disc projecting into the space between the light pipe and the photo-multiplier tube, the disc having contrasting filtering areas therein positioned to be alternately moved by rotation of the disc between the light pipe and photo-multiplier tube, means in the box for rotating the disc, a neon lamp inside the box positioned to illuminate a sensitive area of the photo-multiplier tube for exciting said tube when insufficient light from an external source is admitted to the box, said photo-multiplier tube having a series of dynodes connected in a direct current circuit having a positive pole and a negative pole and having means in the circuit rendering the photo-multiplier tube insensitive to light below a predetermined level of intensity and reducing the voltage between the anode and the cathode when the sustained light intensity increases above said level, the neon lamp being connected with that dynode of the photo-multiplier tube which is closest to the positive pole of said current source whereby the neon lamp glows when the external light entering the box is insufficient to activate the tube and the neon lamp is extinguished when the light from an external source entering the box is sufficient to activate the photo-multiplier tube, said neon lamp being in series between the positive pole of a direct current source and said dynode.

References Cited by the Examiner

UNITED STATES PATENTS

| | | | |
|---|---|---|---|
| 1,898,219 | 2/33 | Sharp. | |
| 2,648,253 | 8/53 | Sweet | 88—22.5 |
| 2,674,155 | 4/54 | Gibson | 88—22.5 |
| 2,794,366 | 6/57 | Canaday | 88—24 |
| 2,927,502 | 3/60 | Watrous | 88—22.5 |
| 2,968,946 | 1/61 | Goldberg et al. | 88—23 X |

FOREIGN PATENTS 1,057,047 10/53 France.

OTHER REFERENCES

Blum: Recording Optical Pyrometer, The Review of Scientific Instruments, vol. 30, No. 4, April 1959.

Seliger: Optical Feedback for Multiplier Phototubes, Electronics, vol. 26, No. 8, August 1953, pages 164–166.

JEWELL H. PEDERSEN, *Primary Examiner.*

EMIL G. ANDERSON, *Examiner.*